N. AUBIN.
Making Oil and Water Gas.
No. 681.
Reissued Apr. 5, 1859.
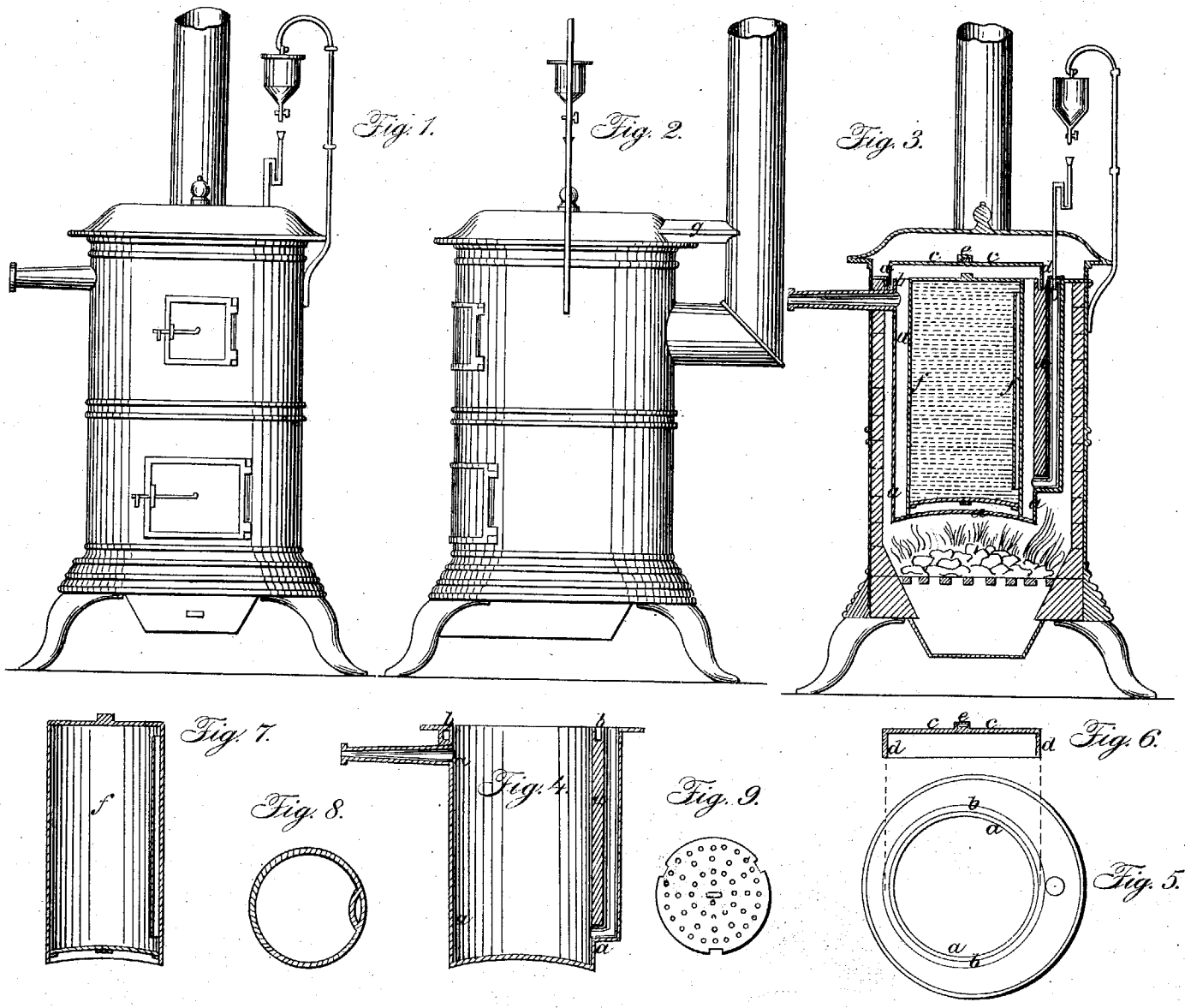
AM. PHOTO-LITHO. CO. N.Y. (OSBORNE'S PROCESS.)

UNITED STATES PATENT OFFICE.

N. AUBIN, OF ALBANY, NEW YORK.

IMPROVEMENT IN TIGHT JOINTS FOR GAS-RETORTS.

Specification forming part of Letters Patent No. 14,045, dated January 8, 1856; Reissue No. 681, dated April 5, 1859.

*To all whom it may concern:*

Be it known that I, N. AUBIN, of the city and county of Albany, and State of New York, have invented a certain new and useful Improvements in Apparatus for Making Illuminating Gas; and I do hereby declare that the following specification, taken in connection with the drawings, is a full, clear, and exact description thereof.

In the drawings, Figure 1 is a front view of an apparatus to which my invention is applied. Fig. 2 is a side view of the same. Fig. 3 is a vertical section through such an apparatus, exhibiting the improvements invented by me. Fig. 4 is a vertical section through a retort. Fig. 5 is a top view of the retort and its groove; Fig. 6, a vertical section through the cover of a retort. Fig. 7 is a section through a charger and reservoir of gas-making materials; and Figs. 8 and 9 are, respectively, a horizontal section through, and a plan of, the bottom of the same; these drawings being merely a type of one of the many forms of gas-making apparatus to which my invention is applicable.

In all kinds of gas-retorts known to me it is necessary at certain times to open the retort for various purposes—such as charging it with new gas-furnishing material or cleaning the retort—and previous to my invention this end has, as far as I know, been accomplished by forcing a door or cover or man-hole plate down upon the body of the retort itself so as to close a hole left therein. This door is usually set into place by a screw or wedge, and is generally packed between itself and the retort by fire-lute or some such substance, as it is essentially necessary that the joint should be gas-tight under the pressure due to the load on the gasometer and the friction due to the passage of gas through the pipes and purifiers. This lute usually hardens by heat, is difficult to make tight originally and keep tight when once made so, and the opening and closing of the retort is usually a dirty piece of work, requiring some strength, skill, experience, and time.

Now, my invention has for its object the remedying of these objections in a simple and efficient manner, and the nature of my invention consists in making a gas-tight joint between the cover or door of a gas-retort and the retort itself by means of a groove and rim, the former of which contains a fusible metal or alloy into which the latter dips and by which it is encompassed, the whole being substantially such and for the purposes herein specified.

The apparatus shown in the drawings, to which my invention is applied, consists of a stove or furnace of any suitable construction, provided with suitable doors for cleaning the fires and charging coal, and also with a grate and chimney. In this stove is inserted a gas-making retort, *a*, of any proper form, having a neck or some suitable provision for connecting it with the pipes leading to the gasometer. This gas-retort is provided with a groove, *b*, and a cover or stopper plate, *e*, the latter having around its periphery a rim, *d*. Both the retort and the cover are to be made of some suitable metal. This cover is for the sake of convenience provided with a handle, *c*, so that it may be lifted and replaced by hand or by a crane, or tackle, if of large size. The gas-making materials may be charged directly into the interior of this retort when the cover is removed, but the plan I prefer is to use a charger and container of materials—such as *f*—having holes or perforations in its bottom, which can be attached to and detached from the charger by any suitable device. Over the cover of the retort is a dome, also having an orifice and cover, and the interior of this dome is connected to the chimney by a pipe, *g*, the object of this dome being to convey away such gas or vapor as may rise when the cover is removed. Connected with the retort is a contrivance for conveying water to a steam-generator, also a generator and orifice for supplying steam to the interior of the retort, but all these representations, excepting those illustrating the cover and its rim and the groove in which the latter fits, need no special description, as they have no bearing on the invention claimed in this patent.

Before using the apparatus the groove is to be filled with some fusible metal or alloy which will melt at a heat below that at which the top of the retort remains when in use. The art of compounding alloys fusible at many different temperatures being well known, this direction will be sufficient. Fire is then got up in the furnace, and the retort is to be charged either directly into its interior or by means of the charger, which is to be filled and inverted into the position shown in Fig. 3. The cover is then to be put in place and its rim will sink into the melted fusible metal contained in the groove. The groove must be of such depth that the elastic force of the gas under ordinary circumstances will not blow out the melted fusible metal, and the rim should be made so as to reach nearly to the bottom of the groove. A depth of groove of from three quarters of an inch to an inch will be usually ample. Now, it is clear that the melted fusible metal surrounding the rim on the cover will make a gas-tight joint between the retort and the cover, and also that the cover can be lifted off or replaced at pleasure, and, further, that such lifting and replacing will unmake and make the joint. The cover should be heavy enough to resist lifting by the pressure of the gas or be weighted down, or it may be held by a catch or stop. The former is the best plan, however, as the cover will then serve as a safety-valve in case of any dangerous accumulation of pressure. It needs no skill to replace or remove the cover to make or unmake the joint, and no annoyance from dirt need take place. If desired, a layer of lamp black or some such substance may be laid on top of the fusible metal to check oxidation. Now, I am aware of the fact that seals, technically so called, or joints formed by water, coal-tar, oil, and other such fluid substances applied in grooves into which a rim dips, have been and are used in many chemical processes, but any such joint would be useless in the combination in which I use my fusible-metal joints, and the peculiarity of this joint is that it is a seal, technically so known, solely on account of the temperature to which the apparatus in which it is used is subjected. If there were no heat applied the joint would be a solid one—such as is made by soldering—and the making and unmaking of the joint and the removal and replacement of the cover would be as difficult, or more so, than is now the case with luted joints.

I claim of my own invention and desire to secure by Letters Patent—

A joint between a gas-retort and its cover made by fusible metal contained in a groove into which enters a rim, the joint being substantially such and for the purposes hereinbefore set forth.

In testimony whereof I have hereunto subscribed my name, in the city of Albany, on the 27th day of March, A. D. 1858.

N. AUBIN.

Witnesses:

CHARLES KNICKERBOCKER,
A. J. MILTON.